(12) United States Patent
Kahler

(10) Patent No.: US 6,196,499 B1
(45) Date of Patent: Mar. 6, 2001

(54) LEAD COMPENSATED ENGINES-ONLY FLIGHT CONTROL SYSTEM

(75) Inventor: Jeffrey Kahler, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/209,171

(22) Filed: Dec. 10, 1998

(51) Int. Cl.[7] .................................................. B64D 31/06
(52) U.S. Cl. ........................................ 244/75 R; 244/195
(58) Field of Search .................................. 244/75 R, 51, 244/52, 182, 181, 194, 195; 201/4, 7, 8, 100

(56) References Cited

U.S. PATENT DOCUMENTS

| | | |
|---|---|---|
| 4,030,011 | 6/1977 | Hendrick et al. . |
| 4,787,042 * | 11/1988 | Burns et al. ............................ 244/181 |
| 4,912,642 * | 3/1990 | Larsen et al. .......................... 244/182 |
| 4,937,512 * | 6/1990 | Takagi .................................. 318/621 |
| 4,947,096 | 8/1990 | Snow . |
| 5,000,404 | 3/1991 | Martorella . |
| 5,330,131 * | 7/1994 | Burcham et al. . |
| 5,531,402 * | 7/1996 | Dahl . |
| 5,641,136 * | 6/1997 | Skow et al. ........................... 244/195 |

* cited by examiner

*Primary Examiner*—Galen L. Barefoot

(57) ABSTRACT

A backup engines-only flight control system accomplishes improved aircraft banking in response to commands by the use of a lead compensated transient differential thrust servo parameter. The lead compensated transient differential thrust servo parameter compensates for the ordinary sluggish banking response during engines-only flight control. Accordingly, because an aircraft equipped with the present invention will respond in a manner expected by pilots, safer backup engines-only flight control is achieved during emergency situations. The improvement comprises a means and method of detecting the magnitude of direction of commanded bank angle and generating a corresponding lead compensated transient differential thrust servo parameter.

17 Claims, 2 Drawing Sheets

LEAD COMPENSATED ENGINES-ONLY FLIGHT CONTROL SYSTEM

FIELD OF THE INVENTION

The present invention relates generally to the field of flight control systems for airplanes. More particularly, to a flight control system that uses engine thrust for backup flight control of a multi-engine airplane. Still more particularly, to a flight control system that eliminates sluggish aircraft banking response. Even more particularly, to the use of lead controllers to eliminate sluggish aircraft banking response.

BACKGROUND

Standard primary flight control systems are generally reliable. Aircraft designers have successfully integrated complex mechanical and electrically controlled flight control components into these standard primary flight control systems. Such systems rely upon aircraft flight surfaces e.g. rudders, flaps ailerons, to control the heading and pitch of an aircraft.

Many standard primary flight control systems have redundant components as part of the standard primary flight control backup system. In the rare event that system fails however, a backup flight control system should be used that is not integral to the primary flight control system. One such flight control system is based entirely on control of the engine thrust.

For multi-engine aircraft, one previously disclosed method of controlling the aircraft uses engine thrust to control the aircraft pitch angle and roll. Pitch angle is controlled by concurrent equivalent thrust adjustments upon laterally positioned engines. Aircraft banking is controlled by differential thrust adjustments upon laterally positioned engines.

The use of differential engine thrust to control aircraft banking is however inexact and leads to difficulty in flying and hazardous landings. Several factors contribute to the control problems; the pilot's inexperience with this method of aircraft control, the less exact control method augmented by a sluggishly responding differential engine control, and the stress of an emergency situation.

One example of related art disclosed in the art of engines-only flight control uses static control parameters to generate servo command parameters indicative of the desired flight-path. For instance U.S. Pat. No. 5,330,131 issued to Burcham et al. ("Burcham") discloses an engines-only flight control system based on differential engine thrust. The disclosure in the Burcham patent discloses a pilot controlled input device consisting of either a control stick, thumbwheel or radio frequency receiver. The input device generates command parameters that are then modulated by scaling circuits and amplified by static gains. The outputs from the static gain amplifiers are then applied to the left and right engine servos through a summation function. The Burcham invention therefore discloses a successful system of engines only flight control. However, it is the static control parameters that lead to sluggish and unfamiliar aircraft banking response.

Another example of remotely related art is disclosed in U.S. Pat. No. 5,551,402 issued to Dahl ("Dahl"). Dahl's system discloses the use of wireless transmitters to control the flight control surfaces by the use of receivers positioned within, or on, the engines. However, Dahl's system of backup flight control depends upon the use of wireless transmitters and receivers, rather than differential engine thrust, to replace the primary engine flight control system.

Therefore, in the event that the standard primary flight control components fail to respond to a pilot's stick commands, a backup engines-only flight control system should be used that does not utilize the standard flight control components, but still permits banking and pitch adjustments. Moreover, this backup engine-only-flight-control-system should preferably respond in a manner that is substantially similar to what the pilot would expect from the primary flight control system. The present invention accomplishes these aims by the incorporation of lead compensation to backup engines-only flight control systems by use of a lead controller. Therefore, the present invention improves the responsiveness and predictability of engines-only flight control, thereby improving the usability, safety and reliability of engines-only flight control.

SUMMARY OF THE INVENTION

It is an object of the present invention to improve the banking response in engines-only flight control. It is another object of the invention to use at least one lead controller to eliminate sluggish banking response during engine-only flight control. It is another object of the invention to improve banking response by modifying existing engine only backup flight control systems based on lateral-differential engine thrust. It is another object of the invention to provide engine-only flight control systems with responsiveness that is substantially comparable to the banking response expected from stick controlled primary flight control systems.

BRIEF DESCRIPTION OF THE DRAWINGS

The novel features characteristic of the invention are set forth with particularity in the appended claims. The invention itself, both as to its structure and its operation together with the additional object and advantages thereof, will best be understood from the following description of the preferred embodiment of the present invention when read in conjunction with the accompanying drawings wherein:

DESCRIPTION OF PREFERRED EMBODIMENTS

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limiting. Rather, the scope of the invention described herein is limited only by the claims appended hereto.

Generally, a multi-engine aircraft will have at least a drive-engine-pair. Each engine of this engine-pair will be positioned equidistant from the fuselage on each wing of the aircraft. During normal flight conditions, the engine-pair provides some or all propulsion to the aircraft. A primary flight control system adjusts the bank and pitch of the aircraft.

The primary flight control system generally comprises a pilot's stick or autopilot output that inputs commands to several standard flight control components, e.g., elevators, ailerons, and rudders. It is also common to provide one or more backup flight control systems. One method of backup flight control uses only the engines to control the pitch and bank angle of the aircraft. This type of backup flight control system will hereinafter be referred to as an engines-only-flight-control system. The present invention, a Lead Controller 1, is useful as an improvement to engines-only-flight-control systems.

A multi-engine aircraft engaged in engines-only-flight-control makes use of main-drive engine-thrust-magnitudes to direct both the pitch and the banking of the aircraft. Thrust magnitudes applied concurrently and equivalently to each laterally positioned main drive engine servo controls the aircraft pitch. Commonly, a proportional plus derivative controller controls the pitch of an aircraft during engine-only-flight, which probably provides the most reliable means of controlling the pitch of the aircraft during engines-only flight. Thus, the primary use of lead compensation is contemplated to be in banking control of engines-only-flight control systems. The use of lead compensation in aircraft pitch angle changes would not be carried out in much the same way as described below for bank angle changes because only a classical control lead would be required.

Figure 1:
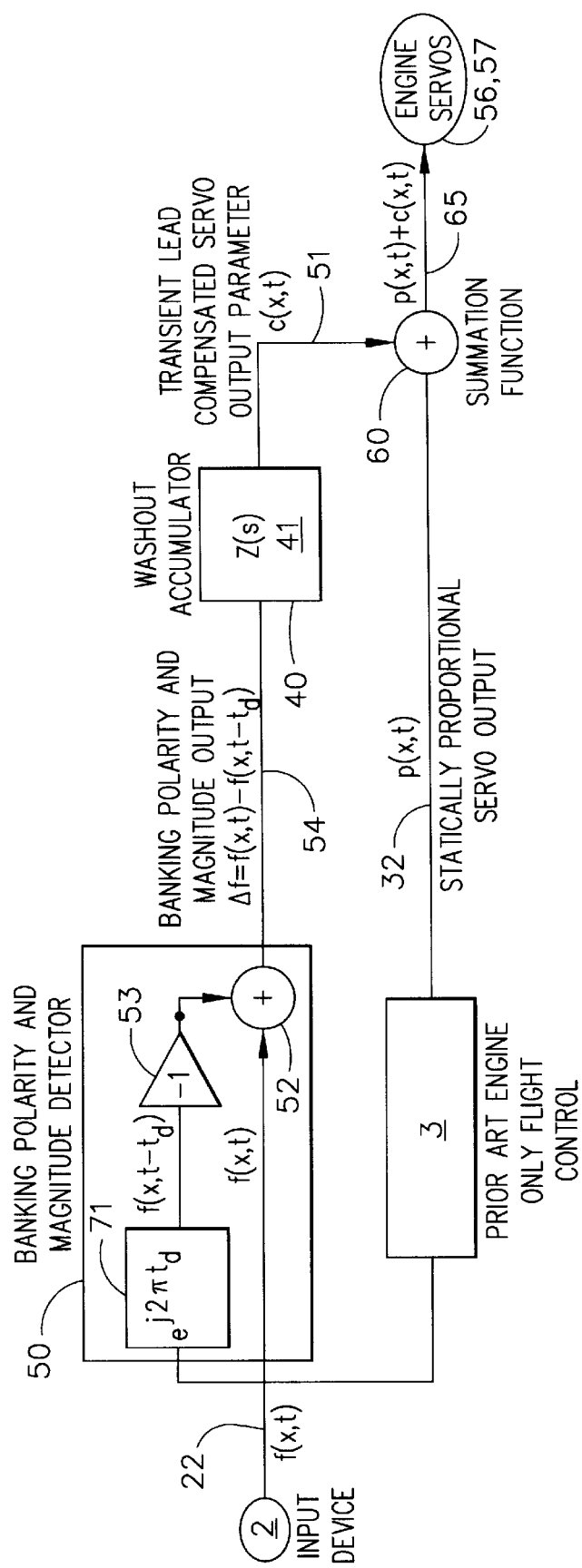
FIG. 1. A depiction of the preferred embodiment of the present invention.

With reference to FIG. 1, the current state of the art of engines-only-flight-control utilizes an input device 2 to initiate aircraft banking changes. The input device 2 is used to issue commands to a prior art engines-only-flight-control system 3 and the system 3 in turn issues banking commands to left and right engine servos 56 and 57. The banking commands issued to the servos 56 and 57 are statically proportional to the lateral displacement of the input device 2. The input device 2 disclosed in the prior art is commonly a device that has discrete directional heading selection capability.

Generally, in current engines-only flight control systems, the lateral position of the input device 2 generates at least one input parameter 22. In these prior art systems, the application of the input parameter 22 to the prior art engines-only flight control system 3 results in a static servo parameter value 32. The static servo parameter value 32 has a static magnitude depending directly upon the lateral position of the input device 2, and polarity corresponding to right or left banking.

The magnitude and polarity of the static servo parameter 32 when the input device 2 is at dead center would have zero magnitude and therefore zero polarity. Accordingly, no banking would result. Ordinarily, the initial or default value of the static servo parameter 32 has a magnitude of zero corresponding to a null lateral thrust differential. A previously known method in the art of engines-only flight control to accomplish the null lateral thrust differential uses roll rate and roll amplitude gyros.

When the input device 2 is displaced to the right or left, a nonzero static servo parameter value 32 having a magnitude proportional to the lateral displacement of the input device 2 results. Moreover, the static servo parameter value 32 would have positive or negative polarity depending upon the direction of the input device 2 displacement. The parameter value 32 is then applied to the engine servos 56 and 57 causing a differential lateral thrust to be applied to the engine pair causing aircraft banking. The actual direction of banking would depend on the polarity of the engine servo parameter value 32.

As mentioned previously, statically proportional thrust differentials applied to the engine servos 56, 57 result in sluggish aircraft banking response. The addition of the Lead Controller 1 to the engines only flight control system improves the responsiveness of the aircraft to bank commands by the application of a lead compensated transient differential thrust servo parameter 65.

As depicted in FIG. 1, the preferred embodiment of the Lead Controller 1 uses an input device 2 and the static servo parameter 32 from prior art engines only flight control systems 3. Moreover, the Lead Controller 1 further comprises a banking polarity and magnitude detector 50, a washout-accumulator 40, and a first summation function 60.

During a typical banking command from the input device 2, the banking polarity and magnitude detector 50 and washout-accumulator 40 generate a lead compensation parameter 51. The lead compensation servo parameter 51 is applied to the first summation function 60 with the statically proportional servo parameter 32 from the prior art engines only flight control system 3. The resultant output from the summation function 60 is the lead compensated transient lateral thrust differential servo parameter 65 that is applied to the engine thrust servos 56 and 57 and as a result, improves the banking response of the aircraft. The Lead Controller 1 can also be equipped with supplementary functions that constrain how much, and if the Controller 1 compensation parameter 51 will modulate the static servo parameter value 32.

Referring to FIG. 1, the banking polarity and magnitude detector 50 of the Lead Controller 1 generates a banking polarity and magnitude output parameter 54 proportional to the direction and magnitude of the rate and direction of change of the input device 2 displacement. The preferred embodiment of the Lead Controller 1 generates the banking magnitude and polarity output parameter 31 by computing the difference between subsequent lateral positions of the input device 2.

Subsequent lateral positions of the input device 2 are compared by applying the input parameter 22 to a delay function 71, multiplying the output with an amplifier having gain of minus one (−1) 53, and applying the result to a second summation function 52. The input parameter 22 not subject to a delay comprises the second input to the second summation function 52. The resultant parameter is the banking polarity and magnitude output parameter 54. Subsequently, this parameter 54 is coupled to the washout-accumulator 40 to affect the desired characteristic compensation.

Figure 2:
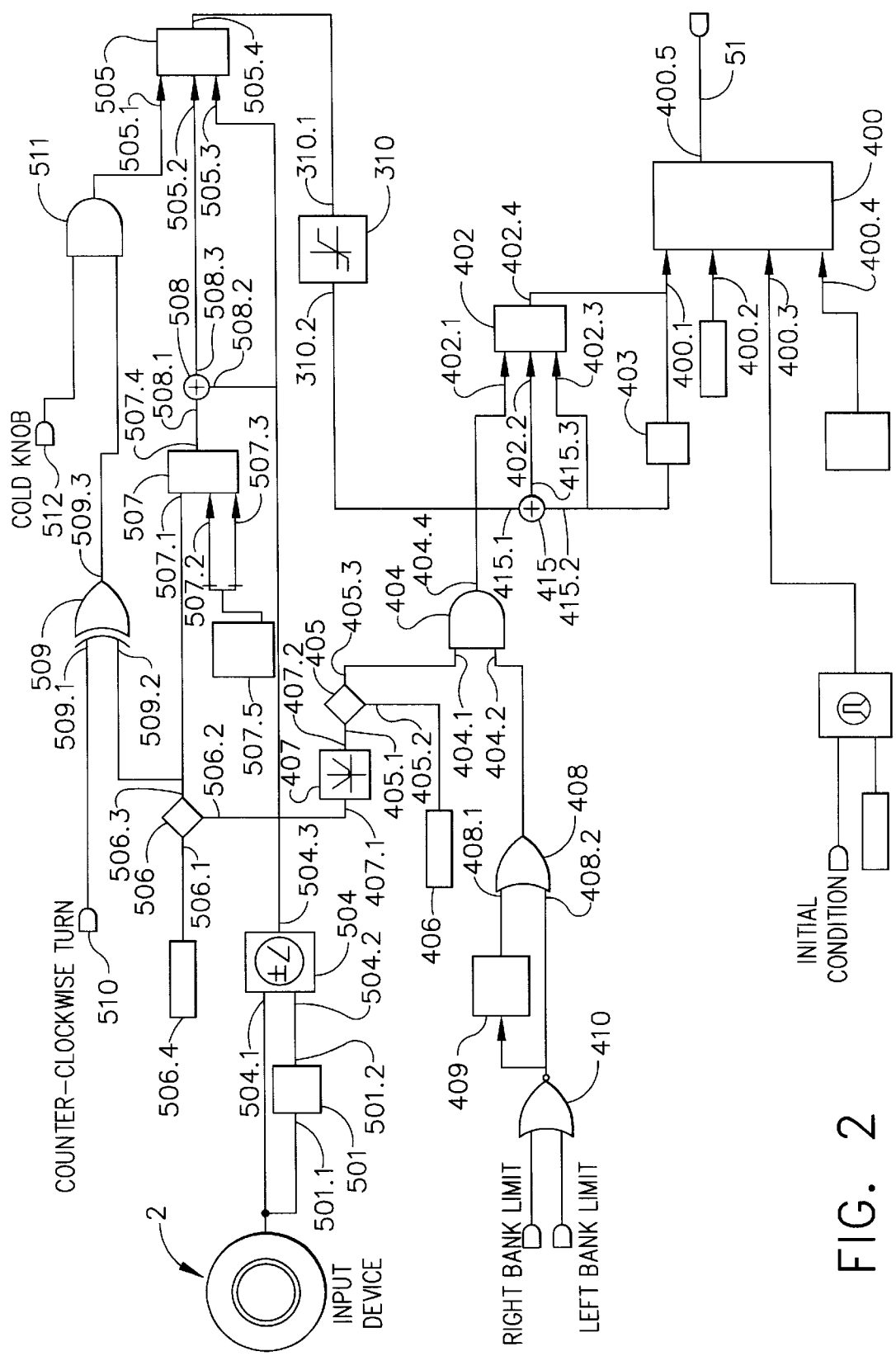
FIG. 2. A depiction of the preferred embodiment in greater detail.

A more detailed depiction of the preferred embodiment of the Lead Controller 1 is depicted in FIG. 2. In this depiction one or more logic gates or circuit functions represent each component discussed above.

In FIG. 2, a discrete unit delay 501, an angle difference calculator 504, and an angle correction switch 505 represent the circuitry comprising the banking polarity and magnitude detector 50 of the depiction of FIG. 1. Additional functions in FIG. 2 required to control the components representing the banking polarity and magnitude detector 50 is the angle polarity comparators 506, an angle adjustment switch 507, and a second summation function 508.

In the depiction of FIG. 2, a input device 2 (e.g., a conventional knob) may be rotated through three hundred and sixty degrees (360°) generates the input parameter 22. The three hundred and sixty degrees of rotation is suitably quantified into discrete segments, 10 each representing, for example, one degree of angular displacement. Moreover, a separate turn direction calculation determines if the angular displacement represents a left bank turn or a right bank turn.

The input parameter 22 of the input device 2 is coupled to a first input 504.1 of the heading difference calculator 504 and also to the input 501.1 of the discrete unit delay 501, respectively. The output 501.2 of the discrete unit delay 501 is coupled to a second input 504.2 of the angle difference calculator 504.

The output 504.3 of the angle difference calculator 504 represents the difference between subsequent input parameter 22 values and is coupled to components representing the washout-accumulator 40 through a limiter 310 and an angle correction switch 505. The angle correction switch 505 is comprised of a logic input 505.1, a adjustment angle input 505.2, an unadjusted angle input 505.3, and an output 505.4.

The angle correction switch 505 represents the ability to correct for angle errors generated when the input device 2 is rotated past plus or minus one hundred eighty degrees (±180°) between subsequent sampling periods during a "cold" knob condition. Cold knob refers to a backup flight control condition whereby a pilot first rotates the input device 2 to select a desired heading, and then engages the backup flight control system commanding the aircraft to chase the desired heading.

Alternatively, a "hot" knob condition refers to a backup flight condition whereby the aircraft immediately responds to input commands from the input device 2. During a hot knob condition, the aircraft is never subject to a input device 2 rotation past plus or minus one hundred eighty degrees (±180°) between subsequent sampling periods and correction of the angle difference calculator output 504.3 is unnecessary. Therefore, during hot knob conditions, the angle correction switch 505 is enabled only to gate the unadjusted output of the angle difference calculator 504.

During cold knob conditions, if the input device 2 is rotated less than plus or minus one hundred and eighty degrees, angle correction is unnecessary. Under such conditions, the logic input 505.1 will be logic low and the angle correction switch 505 will pass the angle difference values calculated by the angle difference calculator 504 coupled to the uncorrected angle input 505.3. On the other hand, angular rotations of the input device 2 greater than plus or minus one hundred and eighty degrees (±180°) require angle correction.

Angle correction is accomplished via that angle correction switch 505 which is controlled via an AND gate 511. Said AND gate 511 has one input, coupled to an independent cold knob input 512 that is asserted during cold knob conditions. During hot knob conditions the cold knob input 512 is logic low. The generation of the logic level cold knob input 512 is considered beyond the scope of the present invention but could be achieved by any manner ordinary in the art.

The other input to the AND gate 511 is coupled to the output of an Exclusive-OR gate 509. The logic state of the output of the Exclusive-OR gate 509 is dependent upon the state of an independent input, Counter-Clockwise Turn 510, and the output of the polarity comparator 506. For the purposes of the embodiment in FIG. 2, the independent input, Counter-Clockwise Turn 510, is asserted when the input device 2 is rotated to the left to command a counter-clockwise turn. Generation of the independent input, Counter-Clockwise Turn 510, is also considered beyond the scope of the present invention. However, ordinary means in the art for developing this input are contemplated.

During a cold knob operating condition, in the event that the input device 2 is rotated past plus or minus one hundred and eighty degrees (±180°) between sampling periods, the angle difference calculator 504 will report an angle difference of less than plus or minus one hundred eighty degrees (±180°). More specifically, rotations to the right past positive one hundred eighty degrees (+180°) will result in negative reported angles and rotations to the left past negative one hundred eighty degrees (−180°) will result in positive reported angles. To provide angle correction in the correct direction and quantity, three hundred sixty degrees (360°) is added to clockwise rotations to the right past positive one hundred eighty degrees (+180°). Likewise, three hundred sixty degrees (360°) is subtracted from counter-clockwise rotations to the left past negative one hundred eighty degrees (−180°).

Angle correction of the angle reported from the angle difference calculator 504 is accomplished with the angle adjustment switch 507, the polarity comparator 506, the angle summation function 508, and the angle correction switch 505. As previously mentioned, if the input device 2 is rotated less than one hundred and eighty degrees in either direction, angle adjustment is unnecessary. Under such conditions, the angle correction switch merely passes the calculated angle differences as reported by the angle difference calculator 504. This condition is further characterized by a logic low condition on the logic input 505.1 of the angle correction switch 505. However, if the input device 2 is rotated past one hundred and eighty degrees (180°) in either direction, angle adjustment is necessary.

To correct errors reported by the angle difference calculator 504, the angle adjustment switch 507 and the angle summation function 508 add an angle adjustment value 507.5 depending upon the output of the polarity calculator 506 and the independent input, Counter-Clockwise Turn 510. The output 504.3 of the angle difference calculator 504 is coupled to one input 506.2 of the polarity comparator 506. The other input 506.1 of the polarity comparator 506 is coupled to a reference angle representing zero degrees (0°). The polarity comparator output 506.3, and accordingly, the logic input 507.1 of the angle adjustment switch 507 will be logic high whenever the input 506.2 of the polarity comparator 506 detects on the output 504.3 of the angle difference calculator 504 an angle difference less than zero.

Conversely, the logic comparator output 506.3, and therefore the logic input 507.1 of the angle adjustment switch 507 will be logic low whenever the input 506.2 of polarity comparator 506 detects on the output 504.3 of the angle difference calculator 504 an angle difference greater than zero. Moreover, only when the input device 2 is rotated to the left will the Counter-Clockwise Turn 510 input will be logic high.

Therefore, if the input device 2 is rotated to the right past positive one hundred eighty degrees (+180°), the angle difference calculator 504 will report a negative angle and the polarity comparator 506 will generate a logic high on the output 506.3. In this condition the Counter-Clockwise Turn 510 input will be logic low. Conversely, if the input device 2 is rotated to the left past negative one hundred eighty degrees (−180°), the angle difference calculator 504 will report a positive angle and the polarity comparartor 506 will generate a logic low on the output 506.3. In this condition the Counter-Clockwise Turn 510 input will be logic high. Only under these two conditions will the Exclusive-OR gate 509.3 assert a logic high on the logic input 505.1 of the angle correction switch 505 thereby enabling angle correction.

The output 507.4 of the angle adjustment switch 507 is coupled to the first input 508.1 of the angle summation function 508. The output 504.3 of the angle difference calculator 504 is connected to the second input 508.2 of the angle summation function 508. The output 508.3 of the summation function 508 is coupled to the second input 505.2 of the angle correction switch 505. If the logic input 505.1 of the angle correction switch 505 is logic high, the angle correction gate output 505.4 will equal the output of the angle summation function 508.3 that represents the corrected angle from the angle difference calculator 504. However if the logic input 505.1 of the angle correction switch 505 is logic low, the angle correction gate output 505.4 will equal the output 504.1 of the angle difference calculator 504.

The limiter 310 couples the output 505.4 of the angle correction gate switch 505.4 to a third summation function 415. The limiter 310 has an input 310.1 and an output 310.2. The input of the limiter 310 is coupled to the output 505.4 of the angle correction gate 505 and the output 310.2 of the limiter 310 is coupled to a third summation block 415. The limiter 310 restricts the output magnitude of the angle correction gate 505. In the preferred embodiment, the actual restricted magnitude would depend upon the aircraft and would be based on safety concerns.

A accumulator summation function 415, an accumulator enable gate 402 and a second unit delay 403 comprise the recursion system of accumulating angle difference calculator 504 output values used by the preferred embodiment of the Lead Controller 1. The accumulator summation function 415 has a first input 415.1, a second input 415.2, and an output 415.3. The first input 415.1 of the accumulator summation function 415 is coupled to the output 310.2 of the limiter 310. The second input 415.2 of the accumulator summation function 415 is coupled to the third input 402.3 of the accumulator enable gate 402 and the output 415.3 of the accumulator summation function 415 is coupled to the second input 402.2 of the accumulator enable gate 402. The output 402.4 of the accumulator enable gate 402 is coupled to the input 403.1 of the second unit delay 403. The output 403.2 of the second unit delay 403 is coupled to the second input 415.2 of the accumulator summation function 415 and the third input 402.3 of the accumulator enable gate 402.

The first input 402.1 of the accumulator enable gate 402 is coupled to an output 404.4 of an AND gate 404. The AND gate 404 operates to enable the accumulator enable gate 402 to begin the accumulation of angular displacement units. The AND gate 404 has a first 404.1 and second 404.2 input. The first input 404.1 of the AND gate 404 is coupled to the output 405.3 of a logic comparator 405. The second input of the logic comparator 405.2 is coupled to an angle reference parameter value 406 corresponding to an angular difference less than a single angular displacement unit 11.

The first input 405.1 of the logic comparator 405 is coupled to the output 407.2 of an absolute value function 407. The first input 407.2 of the absolute value function 407 is coupled to the output 504.3 of the angle difference calculator 504.

The absolute value function 407 of the lead controller 1 is used to signify to the second logic comparator 405 that the angle difference calculator 504 is greater than zero and that the input device 2 has been displaced and changed subsequent values of the input parameter 22. If the output 504.3 of the angle difference calculator 504, and therefore the first input 405.1, of the logic comparator is greater than the reference value 405 on the second input 405.2 of the logic comparator 405, the output 405.3 of the logic comparator 405 will result in a logic high at the first input 404.1 of the AND gate 404. If the other input of the AND gate 404 are also at a logic high level, the accumulator summation function 415, the accumulator enable gate 402, and the second unit delay 403 are enabled to accumulate the discrete angle difference calculator 504 output values. The accumulation of angle difference calculator 504 output values from the angle correction switch 505 is coupled to the components representing the washout-filter 40 of the lead controller 1 of the present invention.

Input 404.2 prevents the banking lead compensation from being applied in the direction of desired bank when the aircraft is up against a bank angle limit in that direction. Input 404.2 is developed by a two input OR gate 408, with two inputs, 408.1 and 408.2 respectively. The first input 408.1 of the OR gate 408 is coupled to the output of a shift register 409. The second input 408.2 of the OR gate 408 is coupled directly to the output of a NOR gate 410. The first and second inputs of the NOR gate 410 are coupled to left and right bank angle limit inputs generated in the ordinary manner of the art. If the aircraft bank angle limit inputs detect that the aircraft is approaching an unsafe left or right bank angle, the corresponding input 408.1 or 408.2 of the NOR gate 410 will be asserted and the accumulation of bank angle displacement units disabled.

Referring again to FIG. 1, the washout-filter 40 comprises a transfer function 41 and operates on the accumulated banking polarity and magnitude output parameter values 54 for the desired characteristic output. Preferably, the characteristic response of the transfer function 40 of the lead controller 1 will be the impulse response of a lead network generally of the form;

$$Z(s) = K \cdot \frac{ds^2 + sg}{cs^2 + bs + a}, \text{ where } s = j \cdot 2 \cdot \pi \cdot f, \text{ for } -\infty < f < \infty, \text{ and}$$

K, a, b, c, d, and g, represent real numbers.

More specifically, the preferred transfer function 40 is generally, $$Z(s) = K \cdot \frac{sg}{bs + a}, \text{ where } s = j \cdot 2 \cdot \pi \cdot f, \text{ for } -\infty < f < \infty, \text{ and}$$

K, a, b, and g, represent real numbers.

In the depiction of FIG. 2, a discrete washout-filter 400 samples the accumulated calculated angle difference values sampled at a rate 402, $f_s = 1/T$. The discrete transfer function 401 used in this depiction of the preferred embodiment is;

$$Z(n) = \frac{K \cdot s}{s + a}, \text{ where } s = \frac{j \cdot 2 \cdot \pi}{n \cdot T}, \text{ for } n = 0, 1, 2, 3, 4 \ldots \text{ and,}$$

K and a represent real numbers dependent upon the aircraft design and the lead response desired. Typical values for K and a are on the order of one (1). The sampling rate of the discrete transfer function 401 depicted in FIG. 2 suitably has a period of approximately 0.05 seconds. Alternatively, another preferred discrete transfer function 401 is;

$$Z(z) = \frac{K \cdot s}{s + a}, \text{ where } s = (2/T) * (z-1)/(z+1), \text{ and}$$

K and a represent real numbers dependent upon the aircraft design and the lead response desired and T is the period of the continuous update rate, for example, approximately 0.05 seconds.

Additional inputs to the discrete washout-filter 400 are the sampling input 400.4, an enable input 400.3, an initial condition input 400.2, and the discrete filter input 400.1. The initial condition input 400.2 provides the discrete filter output 400.5 with a start up and default value that is benign to the engine servos 56 and 57. The value of the initial condition input 400.2 ensures that no banking command will be applied to the engine servos 56 and 57 when the engines-only flight control system is enabled for flight control. The enable input 400.3 switches the output 400.5 of the discrete filter 400 between the value on the initial condition input 400.2 and the accumulated angle difference values.

When the enable input 400.3 is logic high, the output 400.5 of the discrete filter 400 is the value on the initial condition input 400.2. Else, if the enable input 400.3 is at a logic low level, then the output 400.5 of the discrete filter 400 is the result of the discrete transfer function 401 operation on the accumulated angle difference values. The accumulated angle difference values are input to the discrete filter 400 at the discrete filter input 400.1.

The result of the discrete filter 400 operations on the accumulated angle difference values is available at the filter output 400.5. This output 400.5 is summed with the prior art output servo parameter 32 in the first summation block 60 and the aggregate servo parameter is applied to the engine servos 56 and 57 as depicted in FIG. 1.

What is claimed is:

1. In an engines-only-flight control system using lateral thrust differentials between left aircraft engine and right aircraft engine to cause aircraft banking, wherein a pilot issues aircraft banking commands to the engines-only-flight control system by manipulation of an input device, the improvement comprising the introduction of a lead compensated transient differential thrust servo parameter applied between servos associated with said left and right aircraft engines to cause aircraft banking, wherein said lead compensated transient differential thrust servo parameter improves the responsiveness of the aircraft to aircraft banking commands.

2. The improvement in claim 1 wherein said lead compensated transient differential thrust servo parameter is generated by a lead controller comprising;
   a. an input device capable of lateral displacement, coupled to,
   b. a banking polarity and magnitude detector, said banking polarity and magnitude detector being coupled to
   c. a washout-accumulator, said washout-accumulator being further coupled to,
   d. a first summation function, said first summation function also being coupled to,
   e. a prior art engines-only flight control system that generates a statically proportional servo parameter, said prior art engines only flight control system being further coupled to,
   f. said input device, wherein the rate and direction of the lateral displacement of said input device is quantified by said banking polarity and magnitude detector, filtered by said washout-accumulator to induce a lead compensated servo parameter said lead compensated servo parameter being summed with said statically proportional servo parameter in said first summation function and subsequently applied to the servos of said left and right aircraft engines.

3. The improvement in claim 2 for engines-only flight control systems wherein the washout-accumulator further comprises a transfer function having an impulse response of a lead network.

4. The improvement of claim 3 wherein the transfer function of the washout-accumulator is of the form;

$$Z(s) = K \cdot \frac{ds^2 + sg}{cs^2 + bs + a}, \text{ where } s = j \cdot 2 \cdot \pi \cdot f, \text{ for } -\infty < f < \infty, \text{ and}$$

K, a, b, c, d, and g, represent real numbers.

5. The improvement of claim 4 wherein the transfer function of the washout-accumulator is of the form;

$$Z(s) = K \cdot \frac{sg}{bs + a}, \text{ where } s = j \cdot 2 \cdot \pi \cdot f, \text{ for } -\infty < f < \infty,$$

and K and a represent real numbers dependent upon the aircraft design and the lead response desired.

6. The improvement of claim 5 wherein the washout-accumulator is a discrete washout-filter having a transfer function of the form;

$$Z(n) = \frac{K \cdot s}{s + a}, \text{ where } s = \frac{j \cdot 2 \cdot \pi}{n \cdot T}, \text{ for } n = 0, 1, 2, 3, 4 \ldots \text{ and,}$$

K and a represent real numbers dependent upon the aircraft design and the lead response desired and T is the sampling rate.

7. The improvement of claim 5 wherein the washout-accumulator is a discrete washout-filter having a transfer function of the form;

$$Z(z) = \frac{K \cdot s}{s + a}, \text{ where } s = (2/T) * (z - 1)/(z + 1), \text{ and}$$

K and a represent real numbers dependent upon the aircraft design and the lead response desired and T is the discrete update rate.

8. The improvement of claim 2 wherein said banking polarity and magnitude detector comprises;
   a. a delay function having an input and an output said input coupled to said input device and said output coupled to,
   b. an amplifier having an amplifier input, and an amplifier output, and having negative gain, said amplifier output of said amplifier being coupled to,
   c. a second summation function having a first summation input, a second summation input, and a summation output, said first summation input being coupled to said amplifier output and said second summation input being coupled to said input device, wherein the rate and direction of the lateral displacement of said input device is quantified by said delay fruitions, said amplifier and said second summation function.

9. The improvement in claim 6 wherein said delay function comprises a discrete unit delay.

10. The improvement in claim 2 wherein said washout-accumulator comprises a discrete recursion system of accumulating angle difference calculations from said banking polarity and magnitude detector.

11. The improvement of claim 10 wherein said discrete recursion system of accumulating said angle difference calculations for said banking polarity and magnitude detector comprises an accumulator summation function, an accumulator enable gate, and a second unit delay.

12. The improvement in claim 2 wherein said banking polarity and magnitude detector further comprises;
   a. an angle difference calculator, coupled to
      i. an input device, and ii. a discrete unit delay, wherein said angle difference calculator calculates the difference between subsequent angular positions on said input device, said angle difference calculator being further coupled to, b. a polarity comparator, said polarity comparator being further coupled to, i. a reference angle, wherein said polarity comparator compares said difference between subsequent angular positions of said input device to determine if said input device has been rotated past one hundred eighty degrees (±180°), said polarity comparator being further coupled to, c. an angle adjustment switch, that calculates the angular adjustment value needed to adjust incorrectly reported angular displacement calculations due to input device rotations past one hundred and eighty degrees, said angle adjustment switch being further coupled to, d. an angle summation function that sums said reported angular displacement calculations with said angular adjustment value needed to correct for incorrectly reported angular displacement calculations, said angle summation function being further coupled to e. an angle correction switch, that adjusts for angles incorrectly reported from the angle difference calculator, said angle correction switch being further coupled to, f. a limiter that limits the magnitude of the bank angle changes, said limiter being coupled to, g. said washout-accumulator, wherein the rate and direction of the lateral displacement of said input device is quantified by said banking polarity and magnitude detector, filtered by said washout-accumulator to induce a lead compensated servo parameter said lead compensated servo parameter being summed with said statically proportional servo parameter in said first summation function and subsequently applied to the servos of said left and right aircraft engines.

13. An improvement for multiengine aircraft engines-only-flight-control systems based upon a statically proportional engine servo parameter applied between a left aircraft engine servo and a right aircraft engine servo to cause aircraft banking, the improvement comprising the addition of a transient lead compensated servo parameter to said statically proportional engine servo parameter, wherein said addition of said transient lead compensated servo parameter improves aircraft banking response.

14. The improvement in claim 13 wherein said transient lead compensated servo parameter is generated by a lead controller and added to said statically proportional engine servo parameter by a summation function wherein said lead controller detects and quantifies the manipulation of the input device to generate the transient lead compensated servo parameter, and the addition of transient lead compensated servo parameter with said statically proportional engine servo parameter to improve aircraft banking response.

15. The improvement in claim 14 wherein said lead controller further comprises;

a. an input device adapted to generate input parameters, said input device coupled to;

b. a banking polarity and magnitude detector that detects and quantifies said input parameters, said banking polarity and magnitude detector also being coupled to, c. a washout-accumulator adapted to operate on said detected and quantified input parameters, said washout-accumulator also being coupled to, d. a summation function adapted to add, said input parameters having been operated on by said washout-accumulator, to said statically proportional engine servo parameter, wherein a pilot issues commands to the engines-only-flight-control system by manipulation of the input device, and the addition of said parameters operated on by said washout-accumulator to said statically proportional engine servo parameter improves the responsiveness of the aircraft to banking commands.

16. A method of improving the responsiveness of engines-only flight control systems for multiengine aircraft based on lateral engine thrust differentials comprising the steps of:

a. detecting the manipulation of an input device, b. quantifying the rate and direction of manipulation of the input device, c. filtering the detected and quantified manipulation into a transient differential thrust servo parameter, and d. applying the transient differential thrust servo parameter to a left engine servo and a right engine servo, wherein a pilot issues banking commands to the engines-only-flight-control system by manipulation of the input device, and the application of the transient differential thrust servo parameter improves the responsiveness of the aircraft to the banking commands.

17. The method of claim 16 wherein;

e. said step of detecting the manipulation of the input device is accomplished by;

i. subtracting the angular representation of subsequent angular positions of the input device, and f. said step of quantifying the rate and direction of manipulation of the input device, further comprises the step of;

i. subtracting the angles representing subsequent angular positions of the input device with an angle difference calculator to generate angular difference calculations and, g. said step of filtering the detected and quantified manipulation into a transient lead compensated servo parameter, further comprises the step of, i. accumulating said angle difference calculations by a recursion accumulation system to generate an accumulated angle difference result, and ii. operating upon said accumulated angle difference result with a discrete washout-filter having a discrete transfer function equivalent to the impulse response of a lead network to generate a transient lead compensated servo parameter, and h. said step of applying the servo parameter to left and right engine servos further comprises the step of, i. summing said transient lead compensated servo parameter with a statically proportional servo parameter generated by a prior art engine only flight control system to generate the lead compensated transient differential thrust servo parameter, wherein a pilot issues commands to the engines-only-flight-control system by manipulation of the input device, and the application of the lead compensated transient differential thrust servo parameter improves the responsiveness of the aircraft to banking.

* * * * *

UNITED STATES PATENT AND TRADEMARK OFFICE
CERTIFICATE OF CORRECTION

PATENT NO. : 6,196,499 B1
APPLICATION NO. : 09/209171
DATED : March 6, 2001
INVENTOR(S) : Kahler It is certified that error appears in the above-identified patent and that said Letters Patent is hereby corrected as shown below:

At Column 1 line 5, below the title, insert the following paragraph:

--GOVERNMENT INTEREST STATEMENT

The U.S. Government may have certain rights in the present invention under contract no. NAS1-19703, "PROPVISION CONTROLLED AIRCRAFT (PCA)," awarded by the National Aeronautics and Space Administration (NASA).--

Signed and Sealed this

Sixteenth Day of December, 2008

JON W. DUDAS
*Director of the United States Patent and Trademark Office*